US012643803B2

(12) United States Patent
Nathan et al.

(10) Patent No.: US 12,643,803 B2
(45) Date of Patent: Jun. 2, 2026

(54) PROCESS AND SYSTEM FOR SIMULTANEOUS NITRIFICATION AND DENITRIFICATION

(71) Applicant: FLUENCE WATER PRODUCTS AND INNOVATION LTD, Caesarea (IL)

(72) Inventors: Neri Nathan, Kibbutz Ein Ha-Horesh (IL); Yuval Nevo, Caesarea (IL); Chever Ben Yosef, Caesarea (IL); Ronen Itzhak Shechter, Tel Aviv (IL)

(73) Assignee: FLUENCE WATER PRODUCTS AND INNOVATION LTD, Caesarea (IL)

( * ) Notice: Subject to any disclaimer, the term of this patent is extended or adjusted under 35 U.S.C. 154(b) by 0 days.

(21) Appl. No.: 19/385,233

(22) Filed: Nov. 11, 2025

(65) Prior Publication Data

US 2026/0078035 A1 Mar. 19, 2026

Related U.S. Application Data

(63) Continuation of application No. PCT/IL2025/050310, filed on Apr. 8, 2025.
(Continued)

(51) Int. Cl.
*C02F 3/00* (2023.01)
*C02F 3/12* (2023.01)
(Continued)

(52) U.S. Cl.
CPC .............. *C02F 3/006* (2013.01); *C02F 3/121* (2013.01); *C02F 3/1273* (2013.01); *C02F 3/302* (2013.01);
(Continued)

(58) Field of Classification Search
CPC ........ C02F 3/006; C02F 3/121; C02F 3/1273; C02F 3/302; C02F 2101/163;
(Continued)

(56) References Cited

U.S. PATENT DOCUMENTS 8,110,109 B2 * 2/2012 Lemoine ................. C02F 3/006
                                                        210/903
9,758,410 B2 * 9/2017 Doyle ....................... C02F 3/30
(Continued)

FOREIGN PATENT DOCUMENTS

CN          213060360 U  * 4/2021
WO     WO-2023223329 A1 * 11/2023  .............. C02F 3/006

OTHER PUBLICATIONS

Translation of Yedia (CN-213060360-U) (Year: 2021).*

*Primary Examiner* — Ekandra S. Miller-Cruz
(74) *Attorney, Agent, or Firm* — Vorys, Sater, Seymour and Pease, LLP; Maryellen Feehery Hank

(57) ABSTRACT

Disclosed are a process and system for simultaneous nitrification and denitrification of wastewater. The process comprises: (i) subjecting mixed liquor to treatment within at least one membrane aerated bioreactor (MABR), to provide a MABR effluent; (ii) treating said MABR effluent within at least one aeration tank to provide treated mixed liquor, wherein treating said MABR effluent within the at least one aeration tank comprises controlling dissolved oxygen (DO) concentration to be within a concentration range that supports simultaneous nitrification and denitrification within said at least one aeration tank; and (iii) discharging said treated mixed liquor; wherein said is under conditions to provide simultaneous nitrification and denitrification without circulation of mixed liquor. The system also comprises sensors for nitrogen species and a control interface configured for maintaining dissolved oxygen (DO) concentration in the at least one aeration tank according to data from the
(Continued)

sensors, and the DO concentration being limited within a range that supports simultaneous nitrification and denitrification.

17 Claims, 3 Drawing Sheets

Related U.S. Application Data

(60) Provisional application No. 63/631,662, filed on Apr. 9, 2024.

(51) Int. Cl.
  *C02F 3/30* (2023.01)
  *C02F 101/16* (2006.01)
(52) U.S. Cl.
  CPC .... *C02F 2101/163* (2013.01); *C02F 2209/04* (2013.01); *C02F 2209/14* (2013.01); *C02F 2209/15* (2013.01); *C02F 2209/22* (2013.01); *C02F 2301/046* (2013.01)
(58) Field of Classification Search
  CPC .............. C02F 2209/04; C02F 2209/14; C02F 2209/15; C02F 2209/22; C02F 2301/046
  USPC ........................................................ 210/605
  See application file for complete search history.

(56) References Cited

U.S. PATENT DOCUMENTS

2021/0171375 A1 * 6/2021 Houweling ............. C02F 3/102
2023/0079372 A1    3/2023 Ireland et al.

\* cited by examiner

PROCESS AND SYSTEM FOR SIMULTANEOUS NITRIFICATION AND DENITRIFICATION

BACKGROUND ART

References considered to be relevant as background to the presently disclosed subject matter are listed below:
US Patent Application Publication No. 2023079372

TECHNOLOGICAL FIELD

The present disclosure relates to processes and systems for wastewater treatment including simultaneous nitrification and denitrification in one pass.

Acknowledgement of the above references herein is not to be inferred as meaning that these are in any way relevant to the patentability of the presently disclosed subject matter.

BACKGROUND

Membrane aerated Bioreactor (MABR) provides simultaneous nitrification and denitrification (SND). However, the nitrification rate in MABR decreases as a function of residual ammonia in the water, and thus it is less attractive for the downstream part of the wastewater treatment reactor, where compliant low concentrations need to be reached.

The wastewater treatment industry is in constant search for efficient and effective methods and systems.

US 2023079372 describes a membrane aerated biofilm reactor (MABR) and processes for nitritation, nitritation-denitritation or deammonification. The supply of oxygen through the gas-transfer membrane is limited to suppress the growth of nitrite oxidizing bacteria (NOB). Exhaust gas from an MABR unit may have an oxygen concentration of 4% or less. The process can optionally include one or more of: intermittent (batch) feed of process air; process air modulation; process air direction reversal; process air recycle; and, process air cascade flow. The process can optionally include adding a seed sludge containing anammox to a reactor, optionally after pre-treatment and selection. The process can optionally include pre-seeding an MABR media.

GENERAL DESCRIPTION

The presently disclosed subject matter provides, in accordance with a first aspect, a process for simultaneous nitrification and denitrification of wastewater, the process comprises:
   subjecting a mixed liquor to treatment within at least one membrane aerated bioreactor (MABR), to provide a MABR effluent;
   treating said MABR effluent within at least one aeration tank to provide treated mixed liquor; and
   discharging said treated mixed liquor;
   wherein treating said MABR effluent within the at least one aeration tank comprises controlling dissolved oxygen (DO) concentration to be within a concentration range that supports simultaneous nitrification and denitrification within said at least one aeration tank; and
   wherein said treatment in said at least one MABR and said treatment in said at least one aeration tank are each under conditions to provide nitrification and denitrification without circulation of mixed liquor from said at least one aeration tank and/or from a location downstream of said aeration tank to said at least one MABR and/or to a chamber upstream of said at least one MABR.

In some particular cases the DO concentration range is between 0.05 mg/l and 0.80 mg/l, and preferably within 0.05 mg/l and 0.45 mg/l.

Further, the presently disclosed subject matter provides, in accordance with a second aspect, a system for wastewater treatment, comprising:
   at least one membrane aerated bioreactor (MABR) configured to at least partially treat a mixed liquor introduced into the MABR and produce a MABR effluent;
   at least one aeration tank configured to receive the MABR effluent and produce therefrom treated mixed liquor;
   sensor(s) for detecting concentrations of at least two nitrogen species in the at least one MABR tank and/or in the at least one aeration tank and/or downstream of the at least one aeration tank;
   a control interface for controlling dissolved oxygen (DO) concentration in the at least one aeration tank according to data from said sensors for nitrogen species, said DO concentration being limited within a range that supports simultaneous nitrification and denitrification; and
   an outlet configured to discharge treated mixed liquor.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1:
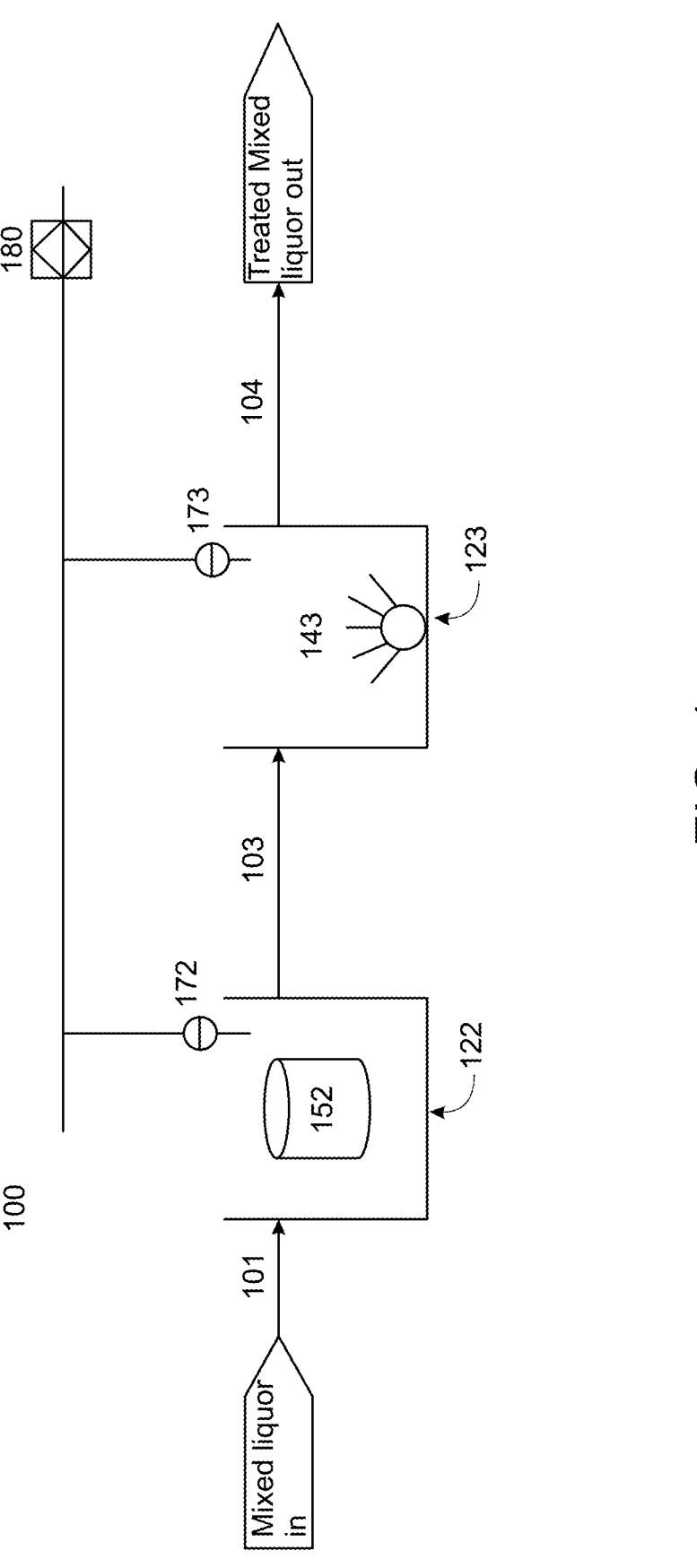
FIG. 1 is a schematic illustration of a system and corresponding process for wastewater treatment, according to some embodiments.

The presently disclosed subject matter relates to wastewater treatment systems and processes, including simultaneous nitrification and denitrification (SND) of wastewater.

In general, the presently disclosed subject matter aims at improving simultaneous nitrification and denitrification (SND) during the wastewater treatment by combining membrane aerated bioreactor (MABR) with an aeration tank operated downstream to the MABR in a manner that provides simultaneous nitrification and denitrification by holding a DO within a range of low concentrations, and without circulation of mixed liquor from the aeration tank to the MABR and/or to a chamber upstream to the MABR.

A unique feature of the presently disclosed subject matter is that the disclosed system and process performing SND, ensure total nitrogen removal, and provide overall process flexibility, simplicity, and efficiency.

A further unique feature of the presently disclosed subject matter is that the manner of operating the aeration tank, as described herein, compensates for the decrease in nitrification rate typically as a function of residual ammonia in the water.

Thus, in accordance with a first aspect of the presently disclosed subject matter, there is provided a process for simultaneous nitrification and denitrification of wastewater.

Generally, the process comprises treating mixed liquor in at least one membrane aerated bioreactor (MABR) to provide a MABR effluent.

As known in the art and used herein, the term "membrane aerated biofilm reactor" or in brief MABR refers to a biological wastewater treatment system comprising gas-permeable membranes on which a biofilm develops. Generally, oxygen is supplied through the membranes directly to the biofilm, enabling simultaneous nitrification and denitrification. In some examples, the MABR is configured as a modular unit with spirally wound or hollow-fiber or flat sheet membranes.

In some examples, the process and/or system can include more than one MABRs and/or more than one MABR membranes in one or more of the MABRs, and/or more than one MABR membranes in a single MABR.

In some examples, the at least one MABR comprises air diffusers, typically located below the MABR membrane. The air diffusers in the MABR can be operated to suspend the solids of the mixed liquor in the MABR tank and/or to scour off any accumulations on the MABR membrane or between MABR membranes with an MABR tank.

In some examples, the air provided to the at least one MABR can be regulated via one or more air control valves located along the air path from a blower to the diffusers below the MABR membranes. For instance, intermittent mixing in the MABR can be controlled by varying the opening and closing frequency of an air control valve to adjust air supply to the diffusers.

The treatment in the MABR involves simultaneous nitrification and denitrification (SND).

Further generally, the process comprises treating the MABR effluent in at least one aeration tank to provide at least partially treated mixed liquor.

As used herein, the term "aeration tank" refers to a vessel or reactor typically used in biological wastewater treatment processes, wherein oxygen is supplied to promote growth and metabolic activity of aerobic microorganisms. The aeration tank is typically equipped with means for aeration, such as diffused air systems and/or mechanical aerators, (as further discussed hereinbelow) to maintain dissolved oxygen levels sufficient to support biological oxidation of organic matter and nutrient removal.

The treatment of the MABR effluent within the at least one aeration tank is under the control of dissolved oxygen (DO) concentration within the at least one aeration tank to be maintained within a concentration range that supports simultaneous nitrification and denitrification within the at least one aeration tank.

Further, the treatment in the at least one MABR and the treatment in the at least one aeration tank are each under conditions that provide SND without the need to circulate mixed liquor (e.g. from any of the at least one aeration tanks) to the at least one MABR and/or to any other chamber upstream to the at least one MABR.

The process further comprises discharging from the at least one aeration tank treated mixed liquor.

In accordance with a second aspect of the presently disclosed subject matter, there is provided a system comprising at least one membrane aerated bioreactor (MABR) configured to at least partially treat a mixed liquor and produce a MABR effluent;

at least one aeration tank configured to receive the MABR effluent and produce treated mixed liquor;

one or more sensors for sensing concentrations of at least two nitrogen species in the MABR and/or in the at least one aeration tank and/or downstream of the at least one aeration tank;

a control interface for maintaining dissolved oxygen (DO) concentration in the at least one aeration tank according to data from the one or more sensors for sensing the at least two nitrogen species, the DO concentration being controlled to be maintained within a range that supports simultaneous nitrification and denitrification in the at least one aeration tank; and an outlet configured to discharge the treated mixed liquor.

In the context of the presently disclosed process and system, the term "at least partially treated mixed liquor" or "treated mixed liquor" is to be understood to refer to a product of treatment of the mixed liquor in the at least one MABR that includes less contaminants when compared to that of the mixed liquor. The difference in the level of contaminants can be even as low as 1% and does not necessarily have to be complete treatment to receive fully treated water.

In some examples of the presently disclosed process and system, the contaminants are any of organic matter expressed as Chemical Oxygen Demand (COD) or expressed as Biochemical oxygen demand (BOD) and nitrogen compounds expressed as ammonia nitrogen or Total Nitrogen (TN) or Total Kjeldahl Nitrogen (TKN).

The DO concentration in the at least one aeration tank is controlled. In some examples of the presently disclosed process and system this is achieved, inter alia, based on concentration of at least two nitrogen species. The concentration of the at least two nitrogen species can be determined/sensed in any one of the at least partially treated mixed liquor/MABR effluent and/or in the liquid within the at least one aeration and/or in the treated mixed liquor discharged from the system or at the end of the process.

In the context of the presently disclosed subject matter, the term "nitrogen species" is to be understood to refer to nitrogen containing compounds typically present in wastewater, this including ammonia ($NH_4^+$—N), nitrate ($NO_3^-$—N), nitrite ($NO_2^-$—N) and total nitrogen.

In some examples of the presently disclosed process and system, the at least two nitrogen species comprise at least ammonia.

In some examples of the presently disclosed process and system, the at least two nitrogen species comprise at least nitrate.

In some examples of the presently disclosed process and system, the at least two nitrogen species comprise ammonia and nitrate.

Further, in the context of the presently disclosed subject matter, the term "concentration of at least two nitrogen species" is to be understood to encompass concentration of at least two selected from ammonia concentration, nitrate concentration, and total nitrogen concentration.

The term "total nitrogen concentration," as used herein, refers to the cumulative concentration of nitrogen-containing compounds present in the mixed liquor entering the membrane aerated biofilm reactor (MABR) and/or in the aeration tank and/or in the treated mixed liquor being discharged at the end of treatment. This includes, but is not limited to, ammonia, nitrite, nitrate, and organic nitrogen compounds, whether dissolved or particulate. The total nitrogen concentration is typically expressed in milligrams per liter as nitrogen (mg/L as N) and serves as an indicator of the nitrogen load within the liquid.

The sensing of the at least two nitrogen species facilitates the control of the DO concentration within the at least one aeration tank. In other words, the controlling of the DO concentration within the at least one aeration tank is determined based on the concentrations of the at least two nitrogen species concentrations.

In some examples of the presently disclosed process and system, based on the concentration of the at least two nitrogen species aeration in one or more of the at least one aeration tank is performed to thereby control the DO concentration in the respective aeration tank.

Aeration in the at least one aeration tank can be achieved by any means known in the art of water treatment. For example, aeration can be achieved by diffusing gas, preferably air, into the aeration tank. The diffusing of gas can be performed using dedicated diffusers, as further described herein.

Alternatively, aeration can be achieved using mechanical aerators, such as surface aerators, turbine aerators, or brush aerators. In some examples, jet aeration systems can also be employed. Combinations of diffused aeration and mechanical mixing may further be utilized to enhance oxygen transfer efficiency and mixing within the aeration tank.

In some examples of the presently disclosed process and system, aeration within an aeration tank can be essentially evenly distributed within the tank, or it can be distributed differently in different zones within a tank.

In some examples, valves positioned along an air distribution network to the at least one aeration tank may be configured to control air supply to different aeration zones, either manually or by the control interface, as further defined herebelow. The control interface is used (manually or automatically, be a control utility) to adjust the DO set point in the aeration tank and the intermittent mixing in the MABR by controlling the opening/closing pattern and/or position of these valves.

In some examples of the presently disclosed process and system, when distributed differently within a tank, the different zones can be aeration in parallel, in series in alternating mode or any combination thereof.

In some examples of the presently disclosed process and system, one or more of the at least one aeration tank comprises two or more aeration zones, and the method comprises controlling aeration of the two or more aeration zones such that the aeration can be differential aeration, i.e., different aeration zones are operated at different aeration intensities. Without being bound thereto, decreasing aeration intensity through more than one aeration zones along an aeration tank can be beneficial for maintaining a low DO and correspond to the decreasing load of ammonia and organic carbon along the process.

In some examples of the presently disclosed subject matter, one or more of the at least one aeration tank comprises two or more aeration zones and the process comprises, or system is configured to control aeration of the two or more aeration zones such that aeration intensity in an aeration zone is higher than that in any downstream aeration zone.

In some examples of the presently disclosed process and system, there is also provided controlling mixing intensity of the mixed liquor in at least one of said at least one MABR.

In some examples of the presently disclosed process and system, there is also provided controlling mixing duration of the mixed liquor in at least one of the at least one MABR.

In some examples of the presently disclosed process and system, there is also provided controlling mixing frequency of the mixed liquor in at least one of the at least one MABR.

In some examples of the presently disclosed process and system, any combination of the following is performed:
  controlling aeration in at least one of said at least one aeration tank,
  controlling mixing intensity of said mixed liquor in at least one of said at least one MABR,
  controlling mixing duration of said mixed liquor in at least one of said at least one MABR; and/or
  controlling mixing frequency of said mixed liquor in at least one of said at least one MABR.

In some examples of the presently disclosed process and system, there is also provided controlling nitrogen species concentrations, wherein the controlling comprises any one or combination of:
  (i) determining ammonia concentration and nitrate concentration in the MABR effluent and/or in any one of the at least one aeration tank, and/or in the effluent from the at least one aeration tank and/or in an effluent from a solid-liquid separation system downstream of the at least one aeration tank; and
  (ii) controlling DO concentration in the at least one aeration tank and/or controlling mixing of mixed liquor in the at least one MABR,
  wherein said controlling of DO concentration and/or mixing comprises:
    increasing mixing in the at least one MABR when the ammonia concentration is above a predetermined ammonia limit, and the nitrate concentration is above a predetermined nitrate limit;
    increasing DO set-point in the at least one aeration tank when the ammonia concentration is above a predetermined ammonia limit, and the nitrate concentration is below a predetermined nitrate limit;
    reducing the DO set-point in the at least one aeration tank when the ammonia concentration is below a predetermined ammonia limit, and the nitrate concentration is above a predetermined nitrate limit; and
  generally maintaining the DO set-point in the at least one aeration tank when the ammonia concentration is below a predetermined ammonia limit, and the nitrate concentration is below a predetermined nitrate limit.

In the context of the presently disclosed subject matter, when referring to "predetermined ammonia limit" it is to be understood to refer to an ammonia concentration set point, typically reflecting effluent quality requirements such as a maximum allowed ammonia concentration in the effluent from the wastewater treatment process. wherein the ammonia concentration relative to said set point is determined using a dedicated sensor, as described herein.

In some examples of the presently disclosed subject matter, the predetermined ammonia limit is a set point for ammonia concentration reflecting effluent quality requirements dictated for example by regulations or permits.

In the context of the presently disclosed subject matter, when referring to "predetermined nitrate limit" it is to be understood to refer to nitrate concentration set point, typically reflecting effluent quality requirements such as a maximum allowed nitrate concentration in the effluent from the wastewater treatment process. wherein the nitrate concentration relative to said set point is determined using a dedicated sensor, as described herein.

In some examples of the presently disclosed subject matter, the predetermined nitrate limit may be derived directly from effluent quality requirements or indirectly such as by a calculation based on the combination of ammonia and total nitrogen requirements.

In the context of the presently disclosed subject matter, the term "DO set point" in the at least one aeration tank is to be understood to refer to the target concentration of the DO in the MABR effluent within the at least one aeration tank. The DO set point is increased or decreased to optimize the SND. Typically, the DO set point is defined in mg/L and is used to regulate how much air or oxygen is supplied.

In some examples of the presently disclosed process, the DO concentration in the aeration tank is controlled to be any value within a range of 0.05-0.80 mg/l or any subranges within this range, as dictated by the control logic described above.

In some examples of the presently disclosed process, the DO concentration in the aeration tank is controlled to be any value within a range of 0.05-0.45 mg/l, or any subranges within this range, as dictated by the control logic described above.

Without being bound to theory, it is noted that maintaining low DO concentrations in the aeration tank, particularly below 0.45 mg/L, does not result in undesirable odor formation. This may be attributed to the relatively high oxidation-reduction potential (ORP) provided by the presence of nitrate in the liquid, acting as an alternative electron acceptor and limiting anaerobic conditions favorable to odor-causing compounds.

In the context of the presently disclosed subject matter, "generally maintaining the DO set-point" is to be understood to mean that there can be fluctuations in the DO concentration within a predetermined range and yet over a period of time, the set point is essentially constant, i.e., the fluctuations do not exceed a predetermined tolerance.

The mixing of the mixed liquor in the at least one MABR can be continuous or intermittent.

In some examples of the presently disclosed process and system, the mixing comprises or is intermittent mixing of the mixed liquor in the at least one MABR. The duration and/or frequency of the intermittent mixing can be manipulated according to at least one quality parameter of the liquid in any one of the process stages and/or system components, during its operation.

In the context of the presently disclosed subject matter, the term "quality parameter" of a liquid is selected from the group consisting of DO concentration, oxidation-reduction potential, ammonia concentration, nitrate concentration and any combination of same. Any of these parameters can be determined by the use of dedicated sensors, as known in the art.

In some examples of the presently disclosed process and system, the duration and/or frequency of the intermittent mixing is determined based upon at least one quality parameter of the mixed liquor.

In some examples of the presently disclosed process and system, the duration and/or frequency of the intermittent mixing is determined based upon at least one quality parameter of the MABR effluent.

In some examples of the presently disclosed process and system, the duration and/or frequency of the intermittent mixing is determined based upon at least one quality parameter of the treated (discharged) mixed liquor.

In some examples of the presently disclosed process and system, there is also provided subjecting the mixed liquor to treatment in an anaerobic tank upstream of the MABR.

In some examples of the presently disclosed process and system, there is also provided preparing the mixed liquor. The preparation of the mixed liquor can be, for example, by mixing wastewater to be treated with activated sludge to produce said mixed liquor. The mixing of wastewater with activated sludge is performed upstream of the at least one MABR and/or within the at least one MABR.

The process can be performed using a single MABR and/or a single aeration tank.

In some examples of the presently disclosed subject matter, the process and system comprise a single MABR.

In some examples of the presently disclosed subject matter, the process and system comprise two or more of the at least one MABR, operating in parallel, in series, in alternating mode, or any combination thereof.

In some examples, when two or more MABRs operate in parallel, the system may be configured to alternate the supply of mixing air between the parallel MABRs. This allows for intermittent mixing cycles to be coordinated across the parallel MABRs, reducing overall air consumption while providing redundancy and optimizing membrane scouring cycles. Alternating mixing air between parallel MABRs can further enhance process flexibility and operational reliability.

In some examples of the presently disclosed subject matter, the process and system comprise a single aeration tank.

In some examples of the presently disclosed subject matter, the process and system comprise two or more of the at least one aeration tanks operating in parallel, in series, in alternating mode, or any combination thereof.

In some examples of the presently disclosed process, there is also discharging the treated mixed liquor into a solid-liquid separation system; such solid-liquid separation system well known in the art.

In some examples of the presently disclosed process, there is also returning an activated sludge stream (RAS) from the solid-liquid separation system to the at least one MABR or to a chamber upstream of the at least one MABR.

As noted above, a unique feature of the presently disclosed process is that the treatment within the at least one MABR and treatment within the at least one aeration tank are controllably operated to provide a continuous simultaneous nitrification and denitrification (SND) from within the at least one MABR and until discharging treated mixed liquor from said at least one aeration tank. It has been found that performing treatment in an MABR followed by treatment of the MABR effluent in an aeration tank, where both treatments perform SND allow for a more efficient overall treatment. For example, it does not require any internal circulation of mixed liquor from the aeration tank to the MABR and as such there can be less dilution of the mixed liquor with treated mixed liquor, providing higher biochemical reaction rates, improving energy efficiency and/or preventing oxygenation of non-aeration tanks.

Turning more specifically to the presently disclosed system, and as detailed above, the system comprises at least one membrane aerated bioreactor (MABR) configured to at least partially treat a mixed liquor and produce a MABR effluent; at least one aeration tank configured to receive the MABR effluent and produce treated mixed liquor, at least one sensor for determining/sensing concentration of at least two nitrogen species (as defined hereinabove) in any one of the MABR tank and/or aeration tank and/or in a sub-unit/system downstream of the aeration tank; a control interface for maintaining dissolved oxygen (DO) concentration in the at least one aeration tank according to data from the sensors for nitrogen species (the DO concentration being limited within a range that supports simultaneous nitrification and denitrification); and an outlet configured to discharge the treated mixed liquor.

As used herein, the term "control interface" refers to any component, device, or arrangement that enables control of one or more functions or operations of the system, whether manually by a user (e.g., via a button, switch, lever, valve, and/or touchscreen), or automatically by an electronic or software-based control module, processor, or logic circuit.

The control interface may thus include, without limitation, physical user-operated controls, graphical user interfaces, wired or wireless communication inputs, and automated control systems configured to generate or transmit control signals based on pre-defined logic, algorithms, or sensor input.

The control interface is operatively connected to the sensors, to any actuators, and/or aeration arrangement and is programmed to adjust system parameters, such as aeration intensity, aeration duration, dissolved oxygen set points, flow rates, etc., based on real-time data received from the system (e.g. from the sensors).

The control interface may include hardware and software components and may execute control algorithms to optimize treatment performance, energy efficiency, and compliance with effluent and/or treated mixed liquor quality requirements.

The control interface may be a dedicated programmable logic controller (PLC), a distributed control system (DCS), or another automated process control unit.

In some examples of the presently disclosed process or system, the control interface is configured to control the DO concentration within the at least one aeration tank, based on the at least two nitrogen species concentrations.

In some examples of the presently disclosed process or system, the control interface is configured to control the DO concentration and at least one water quality parameter by changing any one or combination of:

aeration (intensity/duration/location) in the at least one aeration tank, mixing intensity of the mixed liquor in the at least one MABR, mixing duration of the mixed liquor in the at least one MABR, mixing frequency of the mixed liquor in the at least one MABR, and/or differential aeration within the at least one aeration tank.

In some examples of the presently disclosed process or system, the control interface is configured to control DO concentration in the at least one aeration tank according to ammonia concentration and nitrate concentration in the at least one aeration tank or in a unit downstream of the at least one aeration tank.

In some examples of the presently disclosed system, the control interface is configured to control DO concentration in the at least one aeration tank according to any one of the following conditions:

when ammonia concentration in the at least one aeration tank or in the unit downstream to the aeration tank is above a predetermined ammonia limit, and the nitrate concentration in the same at least one aeration tank or in the same unit downstream to the aeration tank is above a predetermined nitrate limit, the controller causes an increase in mixing duration and/or frequency in said at least one MABR; and when ammonia concentration in the at least one aeration tank or in the unit downstream to the aeration tank is above a predetermined ammonia limit, and the nitrate concentration, in the same at least one aeration tank or in the same unit downstream to the aeration tank, is below a predetermined nitrate limit, the control interface causes an increase in DO concentration in the same at least one aeration tank; and when ammonia concentration, in the at least one aeration tank or in the unit downstream to the aeration tank, is below a predetermined ammonia limit, and the nitrate concentration, in the same at least one aeration tank or in the same unit downstream to the aeration tank, is above a predetermined nitrate limit, the control interface causes a reduction in DO concentration in the same at least one aeration tank; and when ammonia concentration, in the at least one aeration tank or in the unit downstream to the aeration tank, is below a predetermined ammonia limit, and the nitrate concentration, in the same at least one aeration tank or in the same unit downstream to the aeration tank, is below a predetermined nitrate limit, said control interface controls the DO concentration in the same at least one aeration tank.

The control interface is configured to maintain the DO concentration in the at least one aeration tank within a range of between about 0.05 and about 0.80 mg/L or any subranges within this range.

In some examples, the control interface is configured to maintain the DO concentration in the at least one aeration tank within a range of 0.05-0.80 mg/L or any subranges within this range.

In some examples, the controller is configured to maintain the DO concentration in the at least one aeration tank within a range of 0.05-0.45 mg/L or any subranges within this range.

A feature of the presently disclosed system resided in the control interface being designed and pre-programmed to control operation of the at least one MABR and the at least one aeration tank to provide essentially continuous SND without circulation of mixed liquor from the at least one aeration tank to the at least one MABR or to a tank upstream of the MABR.

As used herein, the term "essentially continuous" refers to the process or operation of the system that proceeds without intentional or planned interruption over a substantial period of time, except for brief pauses or variations inherent to normal system dynamics or maintenance activities. In the context of the present disclosure, "essentially continuous" SND means that simultaneous nitrification and denitrification are sustained during the operation of the at least one MABR and the at least one aeration tank, without requiring intermittent or cyclical recirculation of mixed liquor between the aeration tank and the MABR or to a unit upstream of the MABR.

As described hereinabove, the system also comprises one or more dedicated sensors. The sensors are adapted to sense the at least two nitrogen species concentrations in the MABR effluent and/or in the treated mixed liquor being discharged from the at least one aeration tank.

The sensors can be any device configured to measure operational and/or liquid parameters within the system's sub-units, as known to be used in wastewater treatment systems. Such parameters may include, without being limited thereto, DO concentration, temperature, pH, oxidation-reduction potential (ORP), turbidity, nitrogen species concentration (e.g., ammonium, nitrate, or nitrite), flow rate, or liquid level. The sensors generate signals corresponding to the measured parameters and transmit the signals to a control interface. The sensors may be positioned in the aeration tank, within the MABR, or at other locations within the treatment system to enable real-time process monitoring and control.

In some examples, the control interface controls aeration within the at least one aeration tank.

In some examples, the at least one aeration tank comprises two or more aeration zones, and the control interface is configured to maintain the aeration intensity in one aeration zone higher than in any downstream aeration zone.

In some examples of the presently disclosed subject matter, there is provided at least one anaerobic tank upstream of at least one of the at least one MABR.

In some examples of the presently disclosed subject matter, there is provided a mixing arrangement configured to combine wastewater to be treated with activated sludge so as to form the mixed liquor. The mixing arrangement can be installed within the at least one MABR and/or in a chamber upstream of the at least one MABR. Such mixing arrangements are well known in the art of wastewater treatment systems.

In some examples of the presently disclosed subject matter, the at least one MABR includes an intermittent mixing mechanism.

As noted above, the mixing arrangement within the MABR is configured to perform any one of varying mixing duration and/or varying frequency of mixing. These are based on at least one quality parameter of the mixed liquor, and/or of the MABR effluent, and/or of the treated mixed liquor. As detailed hereinabove, the quality parameter can be selected from DO concentration, oxidation-reduction potential, ammonia concentration, nitrate concentration, and/or any combination thereof.

When there is more than one MABR within the presently disclosed subject matter, e.g. the system comprises two or more MABRs, these can be arranged to operate in parallel, in series, in alternating mode, or any combination thereof.

Further, and independently from the arrangement of the two or more MABR, when there is more than one aeration tank, these can be arranged to operate in parallel, in sequence, in alternating mode, and/or any combination thereof.

At least one of the aeration tank(s) discharges the treated mixed liquor, for either collection or further, downstream treatments.

In some examples of the presently disclosed subject matter, the outlet for discharging the treated mixed liquor is coupled to a solid-liquid separation system.

As used herein, the term "solid-liquid separation system" refers to a sub-system configured to separate suspended solids, including biomass or sludge, from the treated mixed liquor being discharged from the aeration tank. The solid-liquid separation system may comprise, for example, a secondary clarifier (settling tank), membrane filtration unit, dissolved air flotation (DAF) system, or other filtration or sedimentation devices. The separated solids may be directed to sludge treatment or recycling (e.g., as return activated sludge), while the clarified liquid is directed to subsequent treatment stages or discharge.

In some examples of the presently disclosed subject matter, the system further comprises a return activated sludge (RAS) conduit configured to direct RAS from the solid-liquid separation system to the at least one MABR or to a location upstream of the at least one MABR.

Reference is now made to FIG. 1 illustrating an exemplary wastewater treatment system and a corresponding process according to some examples of the presently disclosed subject matter.

Specifically, FIG. 1 schematically illustrates a wastewater treatment system 100 comprising a membrane aerated bioreactor (MABR) 122 (interchangeably referred to herein as an MABR tank 122) configured to at least partially treat a mixed liquor and produce an MABR effluent.

In the illustrated example, system 100 includes one MABR 122, and MABR 122 includes one MABR membrane 152. In some examples, the system can include more than one MABRs and/or more than one MABR membranes in one or more of the MABRs, and/or more than one MABR membranes in a single MABR. The corresponding process for wastewater treatment comprises subjecting mixed liquor 101 to treatment within at least one membrane aerated bioreactor (MABR) 122, to provide an MABR effluent 103.

Wastewater treatment system 100 further comprises an aeration tank 123 configured to receive the MABR effluent 103 and produce treated mixed liquor discharged from an outlet 104. In the illustrated example, system 100 includes one aeration tank 123, and the aeration tank 123 includes one zone 143.

In some examples, the system can include more than one aeration tank and/or more than one zones in one or more of the aeration tanks, and/or more than one zones in a single aeration tank. The corresponding process for wastewater treatment comprises treating the MABR effluent 103 within the aeration tank 123 to provide and discharge the treated mixed liquor from outlet 104.

Wastewater treatment system 100 further comprises a control interface 180 configured for maintaining dissolved oxygen (DO) concentration in aeration tank 123 to be limited within a range that supports simultaneous nitrification and denitrification. The corresponding process comprises controlling the dissolved oxygen (DO) concentration in the aeration tank 123 to be limited within a range that supports simultaneous nitrification and denitrification.

In some examples, control interface 180 is configured for maintaining the DO concentration within a range of 0.05-0.80 mg/l, or any subranges within this range.

In some examples, control interface 180 is configured for maintaining the DO concentration within a range of 0.05-0.45 mg/l or any subranges within this range.

It is noted that the preferable low range of DO concentration, for example, of less than 0.45 mg/l, is not associated with bad odors emanating from the process, probably due to the generally high oxidation reduction potential (ORP) maintained by the presence of nitrate in the water, acting as an oxidant.

In some examples, controlling the DO concentration can be performed (for example, by the control interface 180 according to concentrations of one or more nitrogen species in the water during the treatment. For instance, system 100 can comprise one or more sensor(s) to sense (or measure) the concentration of one or more nitrogen species in the MABR tank and/or in the aeration tank and/or downstream of the aeration tank, and based on the data from the sensor(s), the DO concentration in aeration tank 123 can be maintained within a range that supports simultaneous nitrification and denitrification.

In some examples, the one or more sensors can include dedicated sensor(s) adapted to sense at least two nitrogen species concentrations in the MABR effluent and/or in the treated mixed liquor, and the DO concentration in the aeration tank 123 can be controlled accordingly.

In the illustrated example of FIG. 1, system 100 comprises sensors 172 and 173 (one or both of which can be used) for sensing concentrations of at least two nitrogen species in the MABR tank and/or in the aeration tank and/or downstream of the aeration tank. Sensors 172 and 173 communicate the data to controller 180, which then controls the DO concentration in the aeration tank 123 accordingly. The DO concentration can be controlled by one or more operations described in detail herein further below.

In some examples, the treatment process can be performed under condition to provide nitrification and denitrification without circulation of mixed liquor from the aeration tank to the MABR and/or to a chamber upstream to the MABR. For instance, as illustrated, system 100 is free of any circulation network that feeds mixed liquor from aeration tank 123 to MABR 122 and/or to any chamber upstream to the MABR 122.

Control interface 180 controls operation of MABR 122 and the aeration tank 123 to provide continuous simultaneous nitrification and denitrification (SND) without circulation of mixed liquor from aeration tank 123 to MABR 122 directly or indirectly, i.e., via a tank upstream of MABR 122.

Figure 2:
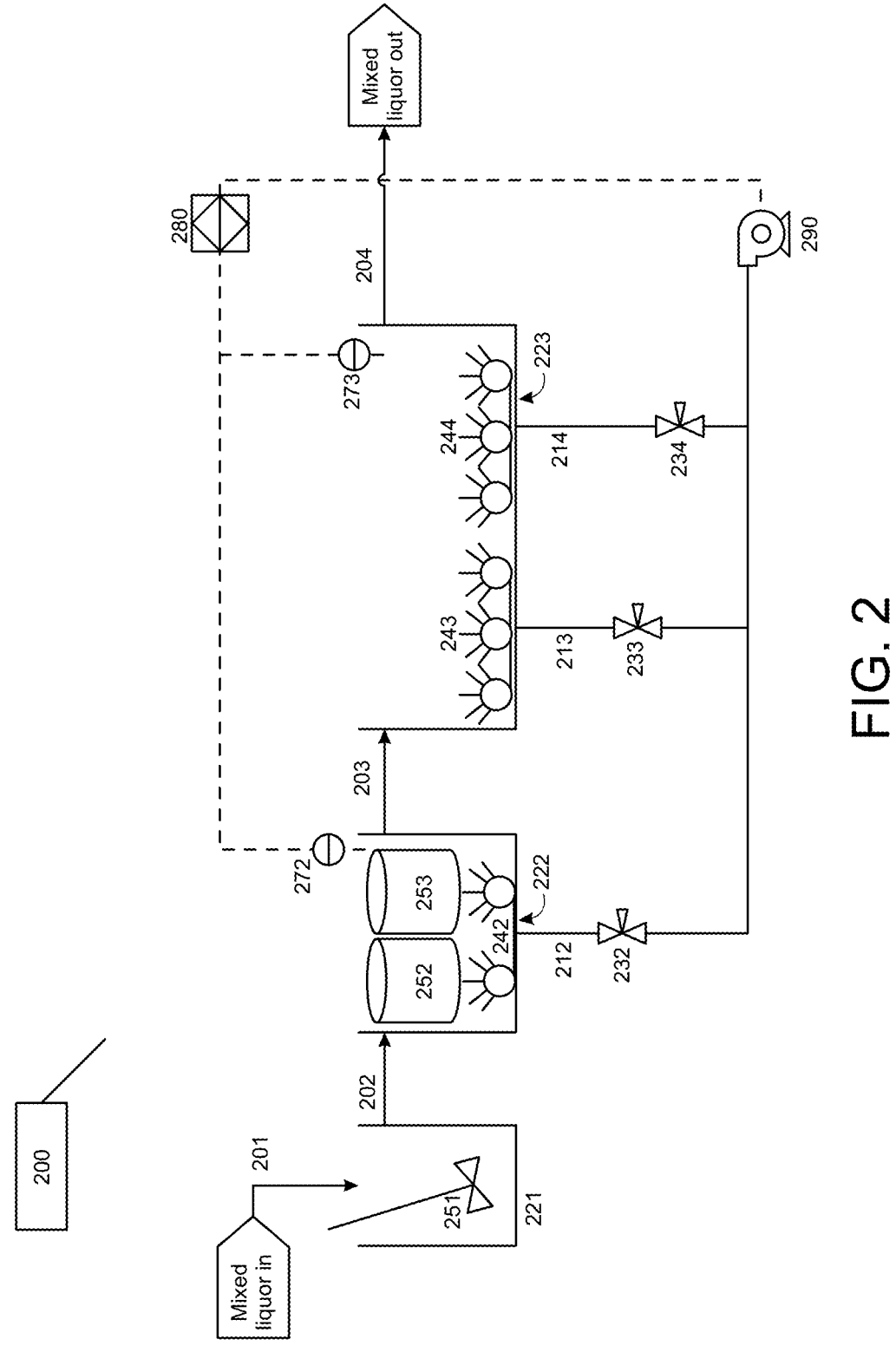
FIG. 2 is a schematic illustration of another system and corresponding process for wastewater treatment, according to some embodiments.

Reference is now made to FIG. 2 illustrating another exemplary wastewater treatment system and a corresponding process according to examples of the presently disclosed subject matter.

It is to be understood herein that the wastewater treatment system 200 and a corresponding process illustrated in FIG. 2 can be a specific implementation of the wastewater treatment system 100 and corresponding process illustrated in, and described above with respect to, FIG. 1. Accordingly, some or all of the description provided above with respect to the wastewater treatment system 100 and the corresponding process of FIG. 1 may also apply to corresponding features of the wastewater treatment system 200 and the corresponding process of FIG. 2. For simplicity, identical reference numbers, incremented by 100, are used in FIG. 2 to denote corresponding components.

Specifically, FIG. 2 schematically illustrates a wastewater treatment system 200 comprising a membrane aerated bioreactor (MABR) 222 (interchangeably referred to herein as an MABR tank 222) configured to at least partially treat a mixed liquor and produce an MABR effluent. In the illustrated examples, system 200 includes one MABR 222, and MABR 222 includes two MABR membranes 252 and 253.

In accordance with some examples, the system can include more than one MABRs and/or more than two MABR membranes in one or more of the MABRs, and/or more than two MABR membranes in a single MABR.

Wastewater treatment system 200 further comprises an aeration tank 223 configured to receive MABR effluent 203 and produce treated mixed liquor discharged from an outlet 204. In the illustrated example of FIG. 2, system 200 includes one aeration tank 223, and this aeration tank 223 includes two zones 243 and 244.

In some examples, the system can include more than one aeration tank and/or more than two zones in one or more of the aeration tanks, and/or more than two zones in a single aeration tank.

Wastewater treatment system 200 further comprises a control interface 280 and sensor(s) 272 and/or 273. Control interface 280 and sensor(s) 272 and/or 273 can operate in the same manner as described above with respect to FIG. 1, and the corresponding description thereof can apply to FIG. 2 as well.

Either or both of system 100 and system 200, and their corresponding processes described above with respect to FIG. 1 and FIG. 2, respectively, may include one or more of the following features described generally herein. For simplicity, when referring to features common to FIG. 1 and FIG. 2, the reference numbers of corresponding components are presented separated by a slash (/).

In some examples, MABR 122 of FIG. 1 and/or MABR 222 of FIG. 2 can be constituted by two or more MABRs operating in parallel, in series, in alternating mode, or any combination thereof. In some examples, systems 100/200 can include two or more MABRs operating in parallel, in series, in alternating mode, or any combination thereof. In some examples, one or more of the MABRs can include two or more MABR membranes operating in parallel, in series, in alternating mode, or any combination thereof.

For instance, in the example illustrated in FIG. 2, the MABR 222 includes two MABR membranes 252 and 253. Some of the benefits of operating more than one MABRs in parallel can be redundancy and the possibility to alternate mixing air between the two lines for intermittent mixing. Some of the benefits of operating more than one MABRs in series can be achieving higher average treatment rate while also enabling intermittent mixing air alteration between stages.

In some examples, one or more of the MABRs can include an intermittent mixing mechanism for providing intermittent mixing of the mixed liquor in the MABR. In some examples, the duration and/or frequency of the intermittent mixing can be varied (manipulated) according to at least one quality parameter (as described hereinabove) of the mixed liquor and/or of the MABR effluent and/or of the treated mixed liquor.

In some examples, the MABR can be mixed intermittently using air diffusers, for example air diffusers 242, shown in FIG. 2, located below the MABR membranes 252 and 253. Without being limited thereto, the air diffusers within the MABR can before suspending solids of the mixed liquor in MABR tank 222 and also for scouring off any accumulations on the membranes 252 or between membranes.

The mixing duration and/or the mixing frequency of the intermittent mixing can be changed by the control interface 180/280 according to the water quality parameter measured by, respectively sensors 172/272 and/or 173/273.

A benefit of controlling the amount of aeration provided by the intermittent mixing can be the possibility to balance the load applied and removed by MABR 122 of FIG. 1 or the MABR 222 of FIG. 2 relative to the aeration volume 123/223, and vice versa, and thus improve the possibility to maintain a desired DO concentration set point to support simultaneous nitrification and denitrification.

The duration and/or the frequency of intermittent mixing of the MABR 122/222 can be defined by setting the time that air is provided to diffusers 142/242 below the MABR membranes 152/252 and/or 153/253, and the time air is not provided.

In the example illustrated in FIG. 2, the air being provided to diffusers 242 can be controlled by controlling (opening and closing) a valve 232 in the air path 212 extending between a blower 290 and the MABR 222.

In some examples, the frequency at which the control valve 232 opens and closes can be controlled. Blower 290 can be any suitable air generation and/or direction mechanism for delivering air to the air diffusers.

In some examples, aeration tank 123/223 can be constituted by two or more aeration tanks operating in parallel, in series, in alternating mode, or any combination thereof.

In some examples, system 100/200 can include two or more aeration tanks 123/223 operating in parallel, in series, in alternating mode, or any combination thereof.

In some examples, one or more of the aeration tanks can include two or more aeration zones. For instance, in the example illustrated in FIG. 2, aeration 223 includes two aeration zones 243 and 244.

In some examples, the aeration of the two or more aeration zones 243 and 244 can be controlled by control interface 280 such that the aeration can be differential aeration, i.e., different aeration zones can be operated at different aeration intensities. For example, the aeration intensity in aeration zone can be higher than that in any downstream aeration zone. For instance, in the example illustrated in FIG. 2, the aeration intensity in aeration zone 243 can be higher than the aeration intensity in aeration zone 244.

The decreasing aeration intensity through more than one aeration zones along aeration tank 123/223 can be beneficial for maintaining a DO concentration at the desired set point and corresponds to the decreasing load of ammonia and organic carbon along the process.

The aeration can be controlled by means such as number of diffusers per unit area in an aeration zone. Accordingly, in some examples, number of diffusers per unit area in a particular aeration zone can be greater than a number of diffusers per unit area in an aeration zone downstream of that particular aeration zone.

In some examples, aeration can be controlled by means such as control valves to provide lower aeration intensity to downstream zones, either manually or by a control interface or another automated system. For instance, in the example illustrated in FIG. 2, the air being provided to aeration zone 243 can be controlled by controlling (opening and closing) a respective valve 233 in the air path 213 extending between the blower 290 and aeration tank 223. Air being provided to aeration zone 244 can be controlled by controlling (opening and closing) a respective valve 234 in air path 214 extending between blower 290 and aeration tank 223. Valves 233 and/or 234 can be controlled by the control interface 280. In some examples, the frequency at which control valves 233 and/or 234 opens and closes can be controlled.

In some examples, the aeration can be controlled by controlling speed of the blower 290, for example, by control interface 280. In some examples, separate blowers can be used for MABR and aeration tanks (not illustrated).

In some examples, the system can include a non-aerated tank, e.g. anaerobic tank upstream of MABR. The process can thus include subjecting mixed liquor to treatment in the non-aerated/anaerobic tank upstream of the MABR. For instance, in the example illustrated in FIG. 2, system 200 comprises an anaerobic tank 221 upstream of MABR 222 into which the mixed liquor is fed via the input line 201, and upon treatment in anaerobic tank 221, the mixed liquor is fed into MABR 222 via the liquid path 202.

In some examples, the process can include mixing, within and/or upstream of the MABR, wastewater to be treated with activated sludge to produce the mixed liquor, and accordingly, the system can include a mixing arrangement configured to combine wastewater to be treated with activated sludge so as to form the mixed liquor. In some examples, the mixing of the wastewater to be treated with activated sludge can be performed within the MABR tank.

In some examples, the mixing of the wastewater to be treated with activated sludge can be performed upstream the MABR tank, for example, the anaerobic tank 221 and/or any other mixing chamber. In the example illustrated in FIG. 2, system 200 comprises a mixing arrangement 251 within tank 221, and the mixing of the wastewater to be treated with activated sludge can be performed by the mixing arrangement 251 within tank 221.

In some examples, an outlet, for example outlet 104/204, for discharging the treated mixed liquor, can be coupled to a solid-liquid separation system, and the process can include discharging the treated mixed liquor from aeration tank 123/223 to the solid-liquid separation system (not illustrated). In such examples, the process can include, for example by corresponding arrangement of the system, returning an activated sludge stream (RAS) from the solid-liquid separation system to the chamber in which the mixing of the wastewater to be treated with activated sludge is to be performed, for example, the MABR, the anaerobic tank, and/or any mixing chamber upstream of the MABR.

It is to be understood herein that in any or both the systems 100/200, and corresponding processes, described herein above with respect to FIGS. 1 and 2, the treatment process can be performed under condition to provide nitrification and denitrification without circulation of mixed liquor from the aeration tank to the MABR and/or to a chamber upstream to the MABR.

For instance, as illustrated, systems 100/200 are free of any circulation network that feeds mixed liquor from the aeration tank 123/223 to MABR 122/222 and/or to any chamber upstream to the MABR 122/222. Control interface 180/280 controls operation of the MABR 122/222 and aeration tank 123/223 to provide continuous simultaneous nitrification and denitrification (SND) without circulation of mixed liquor from the aeration tank 123/223 to MABR 122/222 directly or indirectly, i.e., via a tank upstream of the MABR 122/222.

Without being bound by theory, without the internal circulation of the mixed liquor from the at least one aeration tank to the at least one MABR, there can be less dilution of the mixed liquor with treated mixed liquor, providing higher biochemical reaction rates as well as improving energy efficiency and preventing oxygenation of non-aeration tanks, for example anaerobic tank.

In any or both the systems 100 and 200, and corresponding processes, described herein above with respect to FIG. 1 and FIG. 2, respectively, the treatment within the MABR and treatment within the aeration tank can be operated such as to provide a continuous simultaneous nitrification and denitrification (SND) from within the MABR and until the discharge from the aeration tank, i.e., through the entire process.

In some examples, the process can include controlling, and/or the control interface 180/280 can be configured to control the DO concentration and at least one water quality parameter by changing, any one or combination of:

aeration in one or more of the aeration tank(s), mixing intensity of the mixed liquor in one or more of the MABR(s), mixing duration of the mixed liquor in one or more of the MABR(s), mixing frequency of the mixed liquor in one or more of the MABR(s), and/or differential aeration within one or more of the aeration tank(s).

The above-mentioned controlling can be performed in any one or more manners as described herein above.

In any or both the systems 100/200, and corresponding processes, described herein above with respect to FIG. 1 and FIG. 2, the DO concentration in aeration tank 123/223 can be controlled according to ammonia concentration and nitrate concentration sensed/determined, for example by sensors described herein above, in any one or more of the MABR effluent, in the aeration tank(s), in the effluent from the aeration tank(s), in an effluent from a solid-liquid separation system downstream of the aeration tank(s).

Dissolved oxygen (DO) concentration in the at least one aeration tank can be controlled according to any one or more conditions depicted in FIG. 3, and as described below:

increasing, for example by the control interface, mixing duration, intensity, and/or frequency in the at least one MABR when ammonia concentration is above a predetermined ammonia limit, and the nitrate concentration is above a predetermined nitrate limit;

increasing, for example by the control interface, DO set-point (e.g., DO concentration) in the aeration tank(s) when the ammonia concentration is above a predetermined ammonia limit, and the nitrate concentration is below a predetermined nitrate limit;

reducing, for example by the control interface, the DO set-point (i.e., DO concentration) in the aeration tank(s) when the ammonia concentration is below a predetermined ammonia limit, and the nitrate concentration is above a predetermined nitrate limit;

generally maintaining, for example by the control interface, the DO set-point (i.e., DO concentration) in the aeration tank(s) when the ammonia concentration is below a predetermined ammonia limit, and the nitrate concentration is below a predetermined nitrate limit.

The above-mentioned controlling of the DO and/or mixing duration, intensity, and/or frequency in the MABR can be performed in any one or more manners as described herein above, for example by controlling the aeration.

Figure 3:
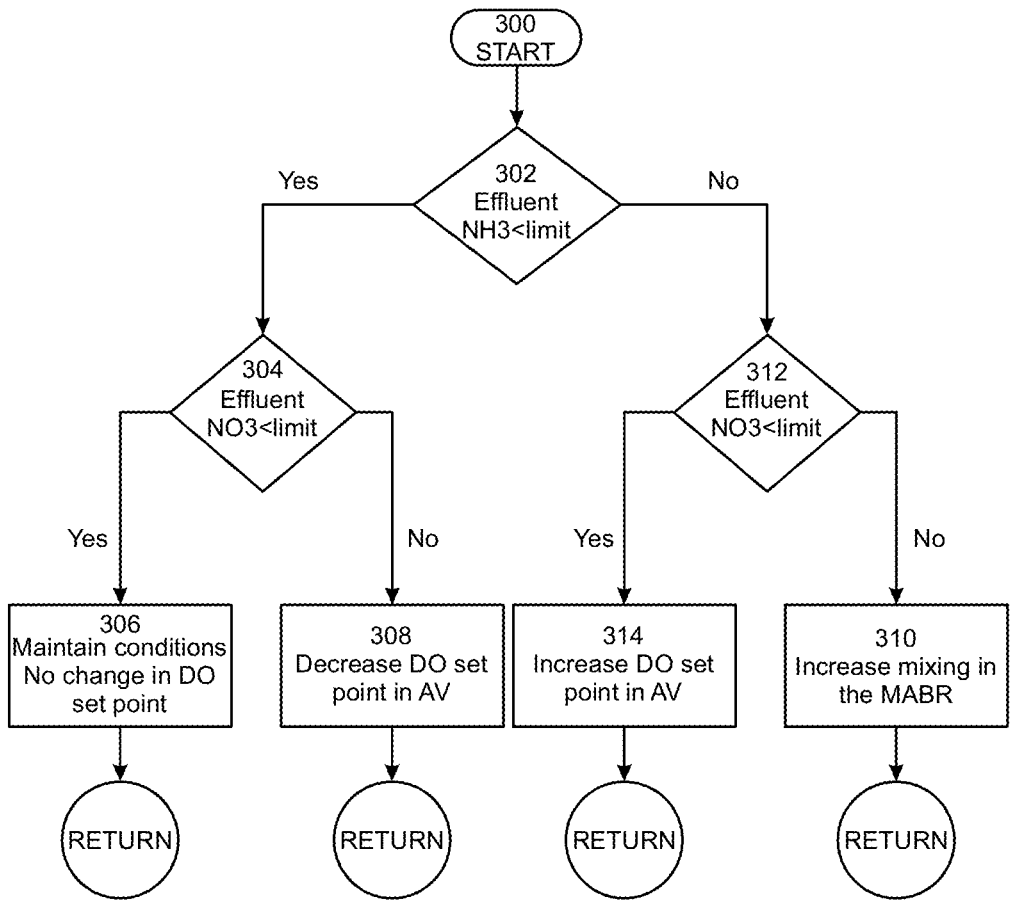
FIG. 3 is a block diagram representing a process for controlling dissolved oxygen (DO) concentration during a part of the wastewater treatment performed in an aeration tank, according to some embodiments.

Specifically, FIG. 3 provides a flow diagram, depicting an example of a control algorithm implemented by a control interface according to some embodiments of the present disclosure.

The process begins at START point (300), where a determination is made as to whether the ammonia (NH$_3$) concentration in the effluent is below (302) or above (312) a predetermined ammonia limit. If the ammonia concentration is below the predetermined limit, the process proceeds to determine whether the nitrate (NO$_3^-$) concentration in the effluent is below a predetermined nitrate limit (304).

If both the ammonia and nitrate concentrations are below their respective limits, the system generally maintains the DO set point, and hence the DO concentration, in the aeration tank(s) (306). If the ammonia concentration is below the ammonia limit but the nitrate concentration exceeds the nitrate limit, the system reduces the DO set point in the aeration tank(s) (308). In both cases, the process returns to START point (300) for continuous monitoring and control (RETURN).

If the ammonia concentration exceeds the ammonia limit, the process proceeds to determine whether the nitrate concentration is below the nitrate limit (312). If so, the system increases the DO set point in the aeration tank(s) (314), or, if both ammonia and nitrate concentrations exceed their respective limits, the system increases the mixing duration, intensity, and/or frequency in the MABR (316). In either case, the process returns to START (300) for continued monitoring and adjustment of system parameters (RETURN).

It may be appreciated by one skilled in the art that other conditions are controlled in the process of the system and method described herein, as in any mixed liquor-based wastewater treatment process. This primarily relates to the mixed liquor suspended solids concentration, known in the art to be controlled by a waste activated sludge stream discharged from a downstream solid-liquid separation system in combination with a return activated sludge stream circulated from said solid liquid separation system to upstream of the MABR tank.

All definitions, as defined and used herein, shall control over dictionary definitions, definitions in documents incorporated by reference, and/or ordinary meanings of the defined terms.

The term "about" as used herein indicates values that may deviate up to 1%, more specifically 5%, more specifically 10%, more specifically 15%, and in some cases up to 20% higher or lower than the value referred to. The deviation range includes integer values and, where applicable, non-integer values as well, constituting a continuous range. In some embodiments, "about" refers to ±10%.

The indefinite articles "a" and "an", as used herein in the description and the claims (unless clearly indicated otherwise), shall be understood to mean "at least one." It must be noted that, as used herein, the singular forms "a," "an," and "the" include plural referents unless the content clearly dictates otherwise.

The clause "and/or", as used herein, should be understood to mean "either or both" of the elements so conjoined, i.e., elements that are conjunctively present in some cases and disjunctively present in others. Multiple elements listed with "and/or" should be construed similarly, i.e., "one or more" of the elements so conjoined. Other elements may optionally be present, whether related or unrelated to the specifically identified elements.

As used herein, the term "or" should be understood to have the same meaning as "and/or" unless the context dictates otherwise. For example, when separating items in a list, "or" and "and/or" shall be interpreted inclusively (i.e., including at least one or more of the listed elements, and optionally others). The use of terms like "only one of," "exactly one of," or "consisting of" will be understood to refer to the inclusion of exactly one element from a list.

The phrase "at least one" in reference to a list of one or more elements should be understood to mean any one or more of the listed elements, but not necessarily each and every one. It does not exclude combinations or the presence of other elements not listed, whether related or unrelated.

Unless clearly indicated otherwise, for any process or system described or claimed herein comprising multiple steps or acts, the order of such steps or acts is not necessarily limited to the order in which they are listed.

Throughout the description and claims, transitional phrases such as "comprising," "including," "having," "containing," and similar expressions are to be understood as open-ended and inclusive, i.e., not excluding other unlisted elements, steps, or features. Only the transitional phrases "consisting of" and "consisting essentially of" are to be construed as closed or semi-closed, in accordance with U.S. patent practice.

It should also be understood that any range disclosed herein (e.g., "from 1 to 6") includes all individual values and sub-ranges within that range (e.g., 2-4, 3-6, etc.). This applies regardless of whether such individual values or sub-ranges are explicitly recited.

As used herein, the term "process" refers to manners, means, techniques, and procedures for accomplishing a given task, including but not limited to those known or readily derivable by practitioners in the fields of environmental engineering, wastewater treatment, or related technical domains.

Certain features described herein in the context of separate embodiments may be combined into a single embodiment. Conversely, features described in the context of a single embodiment may also be provided separately or in sub-combinations. Unless clearly required, no feature is to be considered essential unless the embodiment is inoperative without it.

Various embodiments and aspects of the invention are supported by the examples provided herein. However, the invention is not limited to these examples, and the methods and systems described may be varied or modified by those skilled in the art in accordance with the scope defined by the appended claims and their equivalents.

The examples described herein represent techniques employed by the inventors to practice the invention, and it should be appreciated that, while preferred, various modifications may be made without departing from the spirit or intended scope of the disclosure.

The invention claimed is:

1. A process for simultaneous nitrification and denitrification of wastewater, the process comprising (i) subjecting mixed liquor to treatment within at least one membrane aerated bioreactor (MABR), to provide a MABR effluent; (ii) treating said MABR effluent within at least one aeration tank to provide an at least partially treated mixed liquor; and (iii) discharging said treated mixed liquor wherein treating said MABR effluent within the at least one aeration tank comprises controlling dissolved oxygen (DO) concentration to be within a concentration range that supports simultaneous nitrification and denitrification within said at least one aeration tank; wherein said treatment in said at least one MABR and said treatment in said at least one aeration tank are under condition to provide nitrification and denitrification without circulation of mixed liquor from said at least one aeration tank or from a location downstream of said aeration tank to said at least one MABR or to a chamber upstream of said at least one MABR; and wherein treatment within the at least one MABR and treatment within the at least one aeration tank is operated such that continuous simultaneous nitrification and denitrification (SND) is sustained throughout the entire operation of the at least one MABR and the at least one aeration tank.

2. The process of claim 1, comprising sensing concentrations of at least two nitrogen species in the MABR effluent or within said at least one aeration volume or in a treated mixed liquor.

3. The process of claim 2, wherein said nitrogen species concentrations are selected from the group consisting of ammonia concentration, nitrate concentration and total nitrogen concentration.

4. The process of claim 2, wherein said controlling of DO concentration within the at least one aeration tank is determined based on said concentrations of the at least two nitrogen species concentrations.

5. The process of claim 1, wherein said controlling of DO concentration comprises aeration in one or more of said at least one aeration tanks.

6. The process of claim 1, comprising controlling any one or combination of:—aeration in at least one of said at least one aeration tank,—mixing intensity of said mixed liquor in at least one of said at least one MABR,—mixing duration of said mixed liquor in at least one of said at least one MABR; or—mixing frequency of said mixed liquor in at least one of said at least one MABR.

7. The process of claim 1, comprising controlling of nitrogen species concentrations, wherein said controlling comprises: (i) determining g ammonia concentration and nitrate concentration in said MABR effluent or in any one of the at least one aeration tank, in the effluent from said at least one aeration tank or in an effluent from a solid-liquid separation system downstream of the at least one aeration tank; and (ii) controlling DO concentration in said at least one aeration tank or controlling mixing of mixed liquor in said at least one MABR, wherein said controlling of DO concentration or mixing comprises:—increasing mixing in said at least one MABR when said ammonia concentration is above a predetermined ammonia limit, and said nitrate concentration is above a predetermined nitrate limit;—increasing DO set-point in said at least one aeration tank when said ammonia concentration is above a predetermined ammonia limit, and said nitrate concentration is below a predetermined nitrate limit;—reducing the DO set-point in said at least one aeration tank when said ammonia concentration is below a predetermined ammonia limit, and said nitrate concentration is above a predetermined nitrate limit; and—maintaining the DO set-point in said at least one aeration tank when said ammonia concentration is below a predetermined ammonia limit, and said nitrate concentration is below a predetermined nitrate limit.

8. The process of claim 1, wherein said DO concentration in the aeration tank is controlled to be within a range of 0.05-0.80 mg/l.

9. The process of claim 1, wherein said DO concentration in the aeration tank is controlled to be within a range of 0.05-0.45 mg/l.

10. The process of claim 1, wherein said at least one aeration tank comprises two or more aeration zones and said process comprises controlling aeration of the two or more aeration zones such that aeration intensity in an aeration zone is higher than that in any downstream aeration zone.

11. The process of claim 1, further comprising subjecting the mixed liquor to treatment in an anaerobic tank upstream of the MABR.

12. The process of claim 1, comprising mixing wastewater to be treated with activated sludge to produce said mixed liquor, wherein said mixing is performed upstream of the at least one MABR or within the at least one MABR.

13. The process of claim 1, comprising providing intermittent mixing of the mixed liquor in the at least one MABR, the duration or frequency of the intermittent mixing being manipulated according to at least one quality parameter of said mixed liquor or of said MABR effluent or of said treated mixed liquor, the quality parameter being selected from the group consisting of DO concentration, oxidation-reduction potential, ammonia concentration, nitrate concentration and any combination thereof.

14. The process of claim 1, comprising two or more of said at least one MABR, operating in parallel, in series, in alternating mode, or any combination thereof.

15. The process of claim 1, comprising two or more of said at least one aeration tank operating in parallel, in series, in alternating mode, or any combination thereof.

16. The process of claim 1, wherein said discharging of said treated mixed liquor is to a solid-liquid separation system.

17. The process of claim 16, comprising returning an activated sludge stream (RAS) from said solid-liquid separation system to said at least one MABR or to a chamber upstream of said at least one MABR.

* * * * *